United States Patent
Vermette

[11] 3,797,672
[45] Mar. 19, 1974

[54] APPARATUS ATTACHABLE TO A TRUCK BODY OR THE LIKE FOR USE FOR HOISTING OR LIFTING, OR AS AN ELEVATED SUPPORT

[76] Inventor: Howard H. Vermette, No. 7-143rd St., Hammond, Ind. 46320

[22] Filed: Mar. 10, 1972

[21] Appl. No.: 233,582

[52] U.S. Cl.............. 212/8, 212/46 R, 212/59 R, 254/139.1, 214/75 H
[51] Int. Cl. ............................................. B66c 23/36
[58] Field of Search............ 212/8, 46 A, 46 R, 58, 212/59, 74; 214/75 H; 254/139.1

[56] References Cited
UNITED STATES PATENTS

| | | | |
|---|---|---|---|
| 2,549,120 | 4/1951 | Ormsby........................... | 254/139.1 |
| 3,055,511 | 9/1962 | Sharp............................. | 254/139.1 X |
| 3,596,976 | 8/1971 | Eitel et al...................... | 212/59 R X |
| 2,177,525 | 10/1939 | Henderson...................... | 214/75 H |
| 3,332,181 | 7/1967 | Carlson.......................... | 254/139.1 X |
| 3,111,225 | 11/1963 | Miller et al. .................. | 212/8 R |
| 3,700,117 | 10/1972 | Corley........................... | 212/46 R X |

FOREIGN PATENTS OR APPLICATIONS

| | | | |
|---|---|---|---|
| 1,096,078 | 12/1967 | Great Britain ................. | 212/46 R |
| 1,075,812 | 2/1960 | Germany ........................ | 212/46 A |
| 1,022,778 | 1/1958 | Germany ........................ | 212/46 A |

Primary Examiner—Richard L. Aegerter
Assistant Examiner—Jeffrey V. Nase
Attorney, Agent, or Firm—Max R. Kraus

[57] ABSTRACT

A unit formed of components which may be shipped in disassembled condition to occupy a minimum of space, yet may be readily assembled and attached to the truck body of a vehicle to provide a mobile unit having a main beam which may be moved from a horizontal transporting position to a substantially vertical or upright position so that said beam may be utilized to raise a load to a substantial height, or said beam may be used as a support whereby a person can stand thereon to perform certain operations requiring considerable height. When the unit is attached to the truck body it has the mobility of the truck and moves with the truck from one place to another and is always ready for instant use.

18 Claims, 15 Drawing Figures

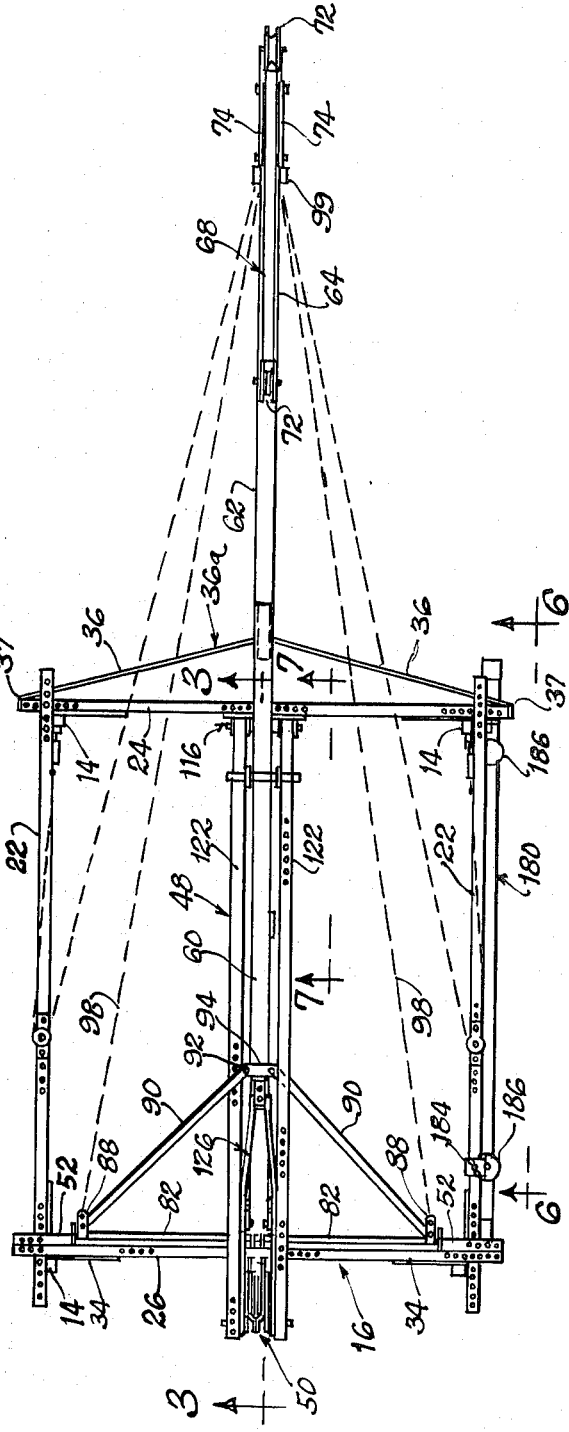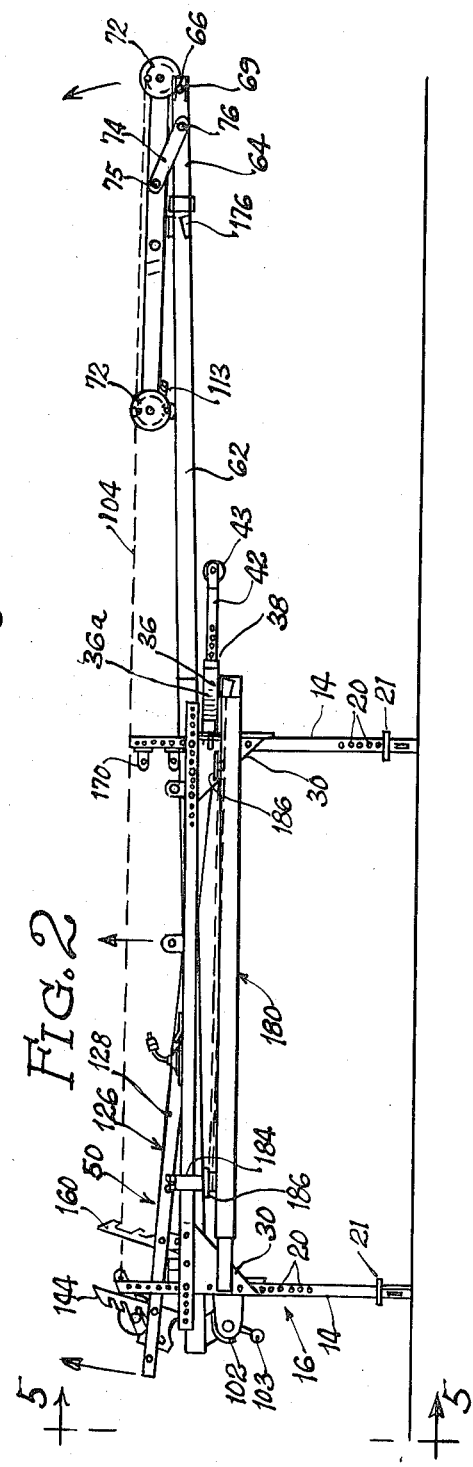

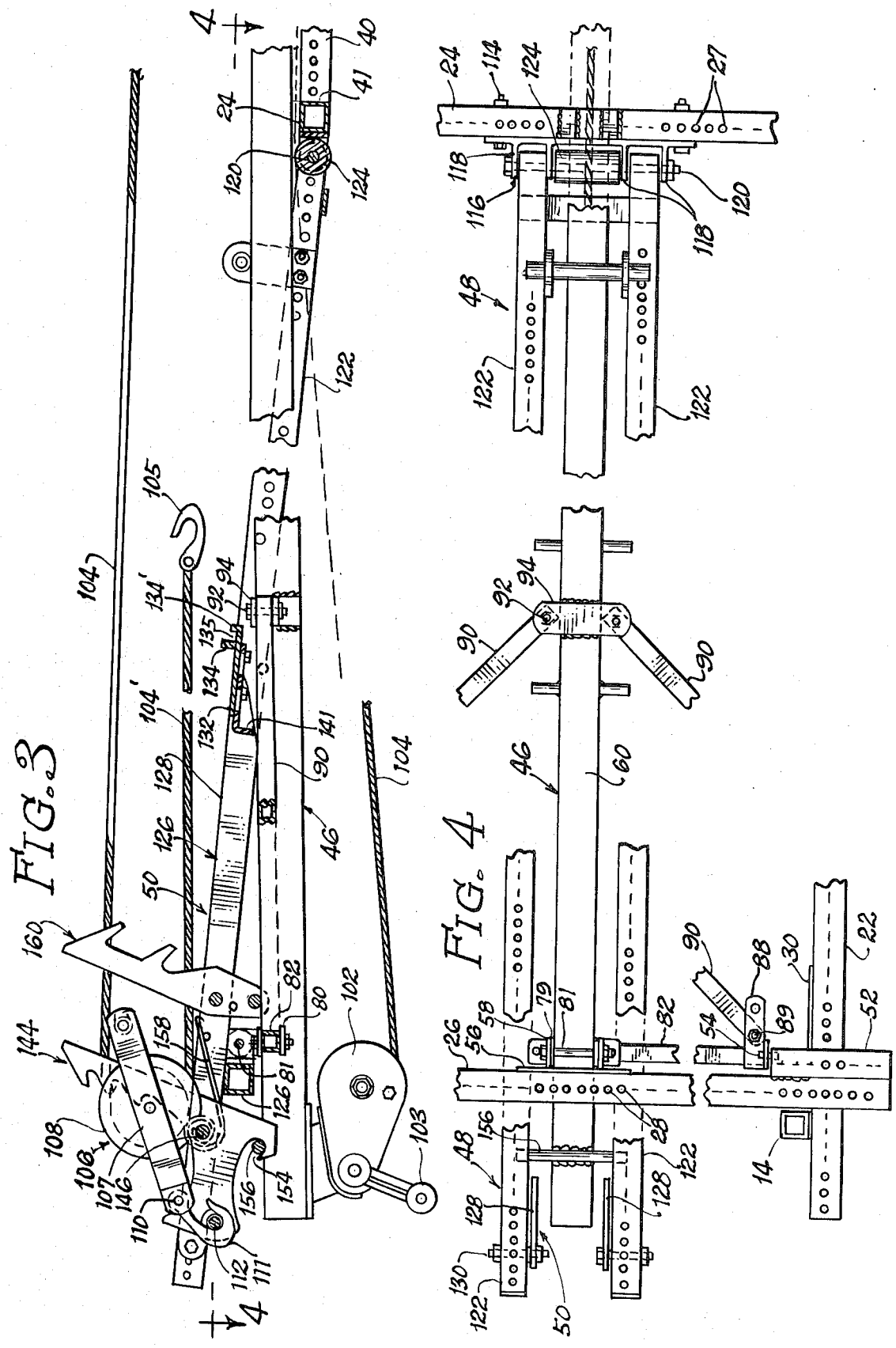

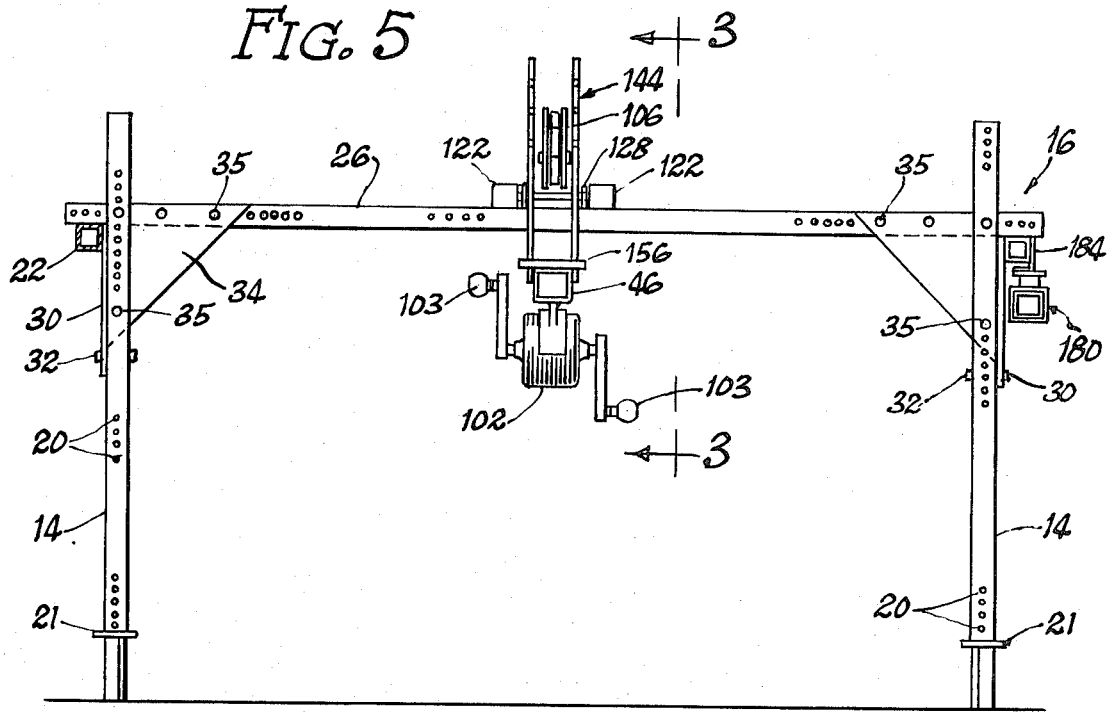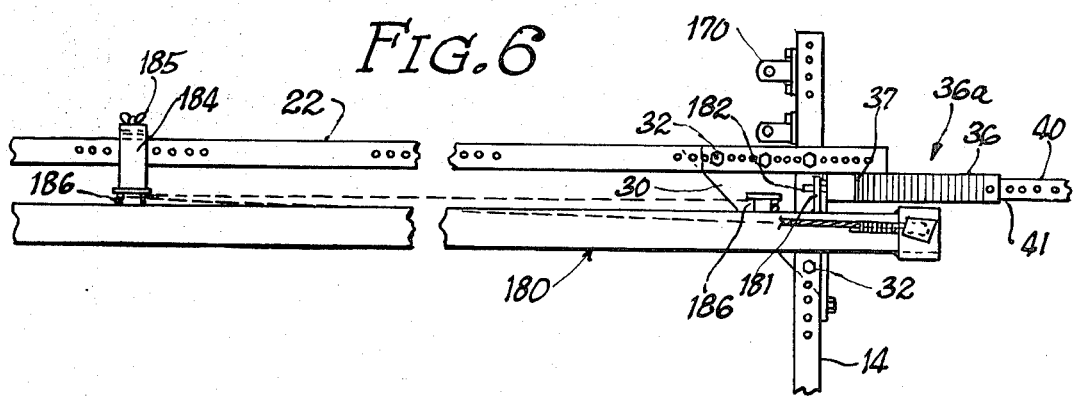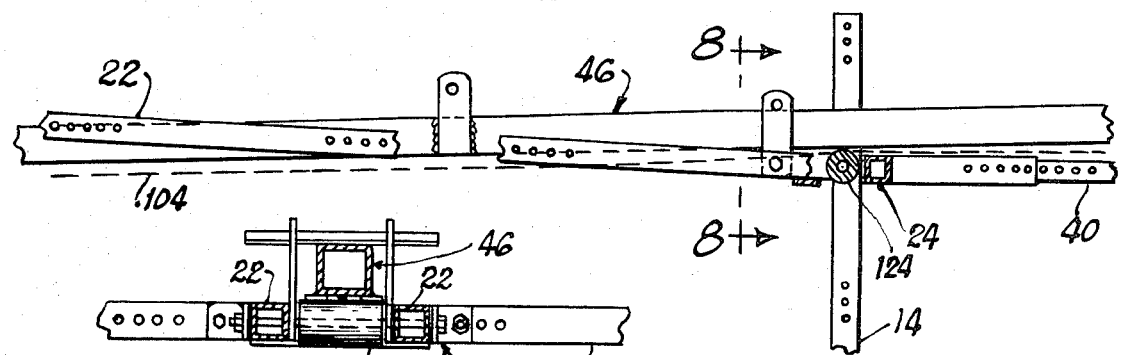

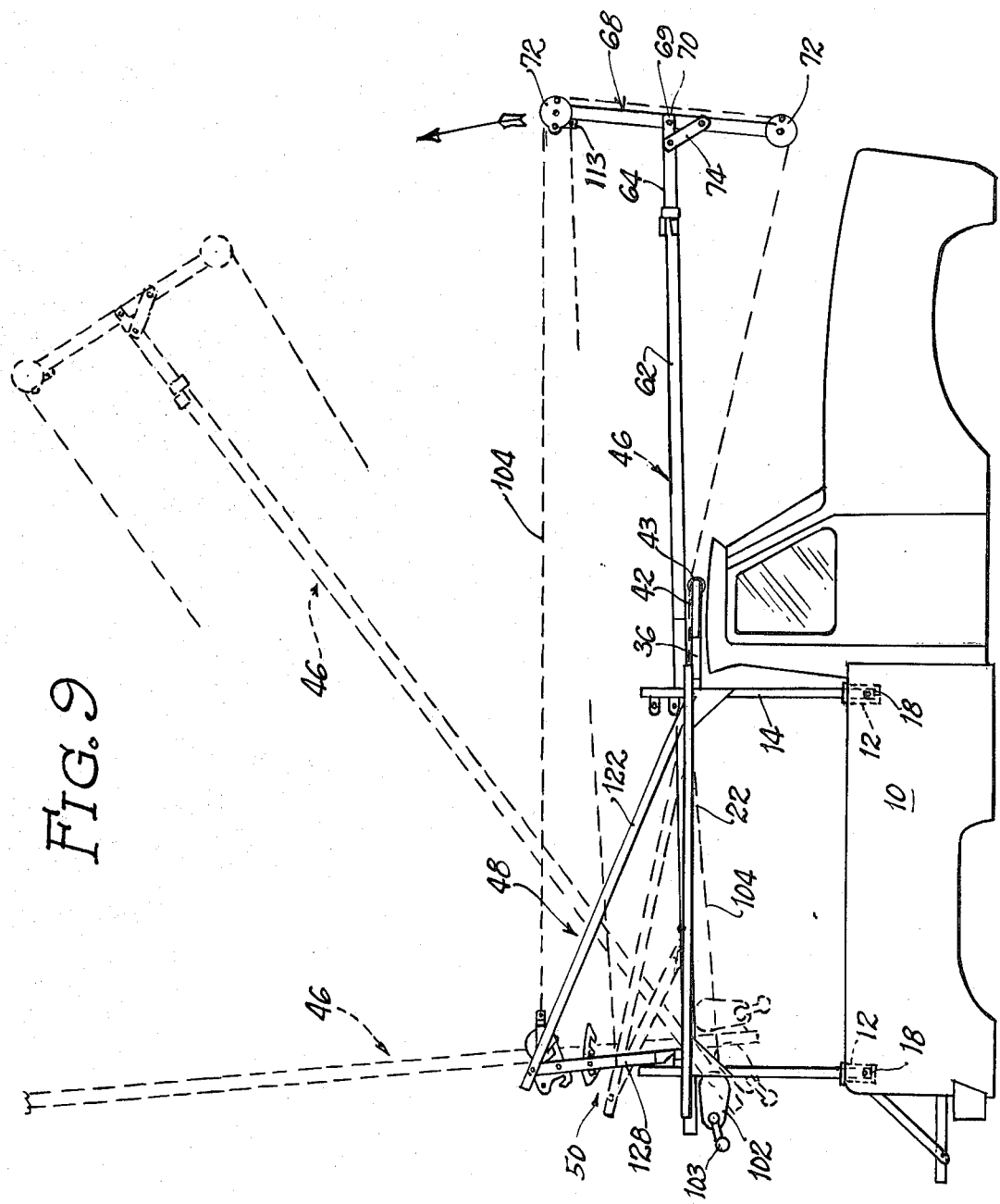

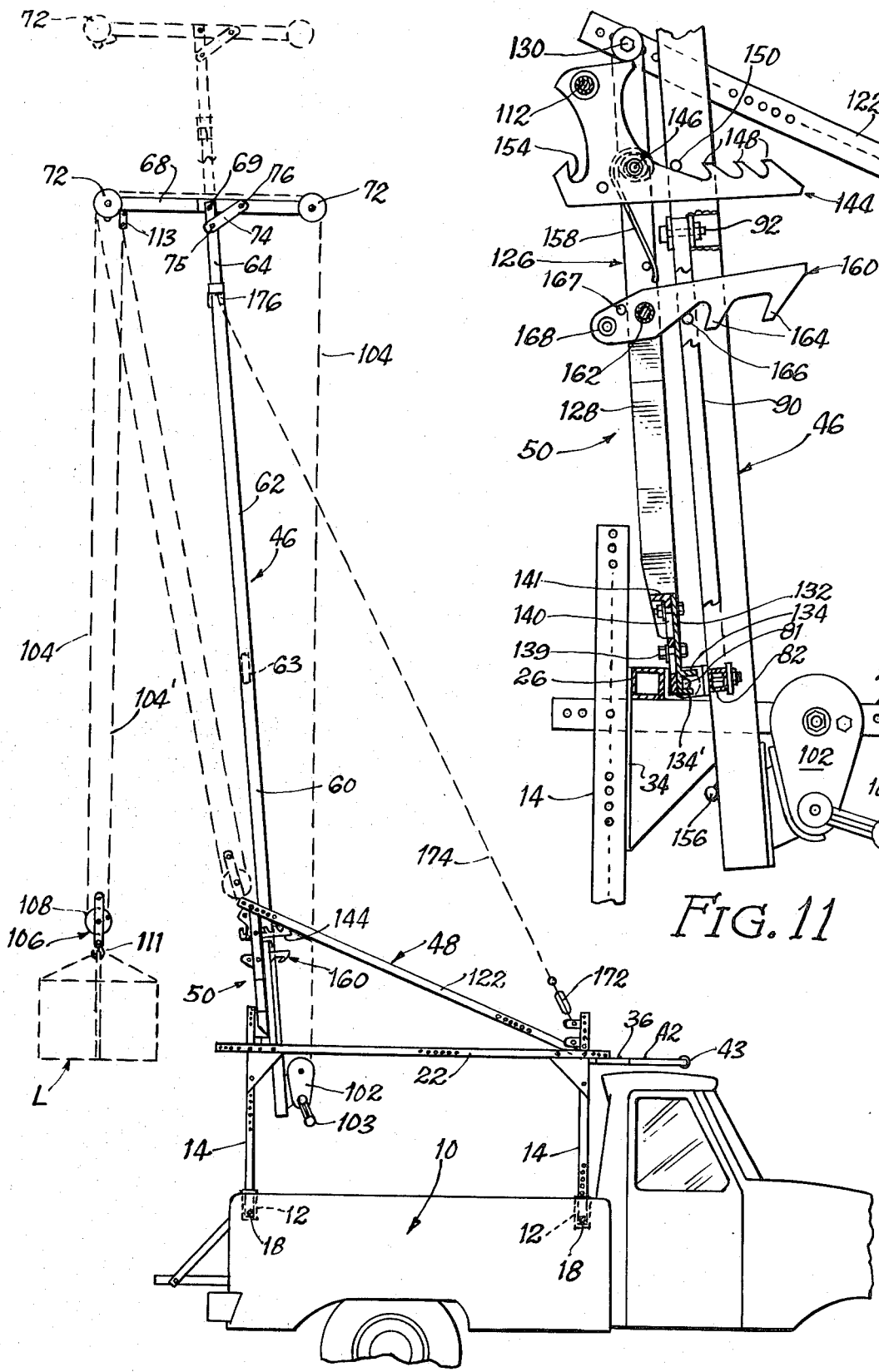

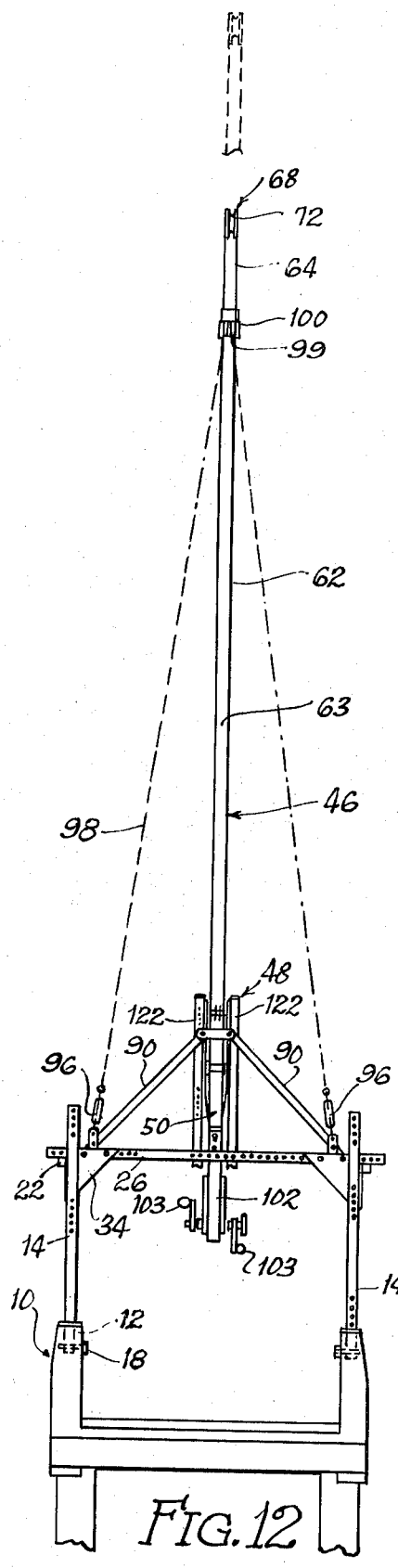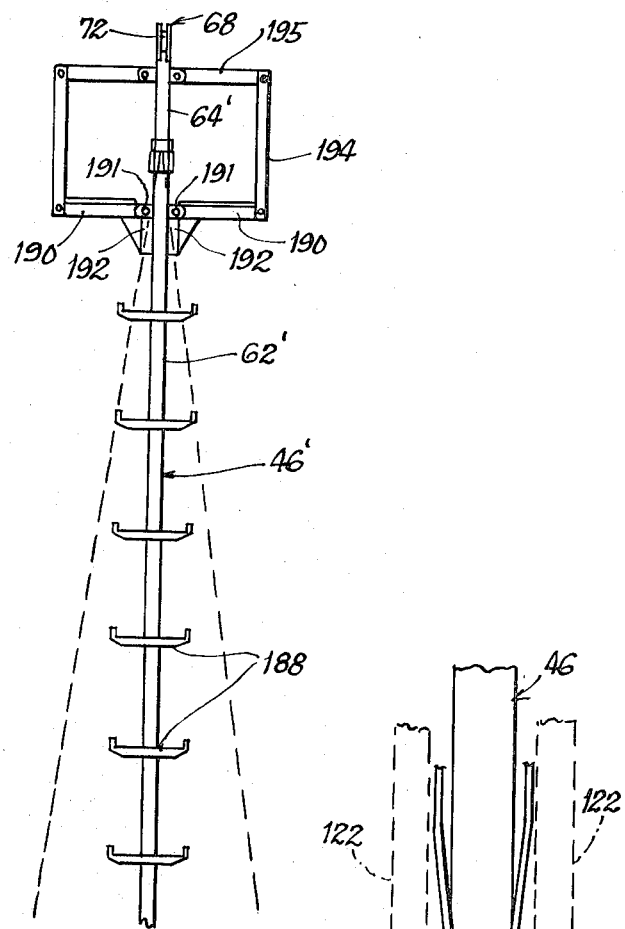
FIG. 15
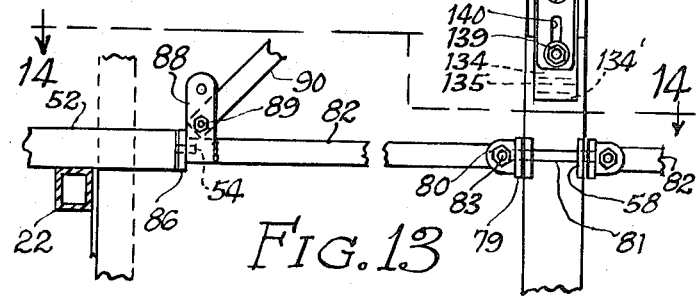
FIG. 13
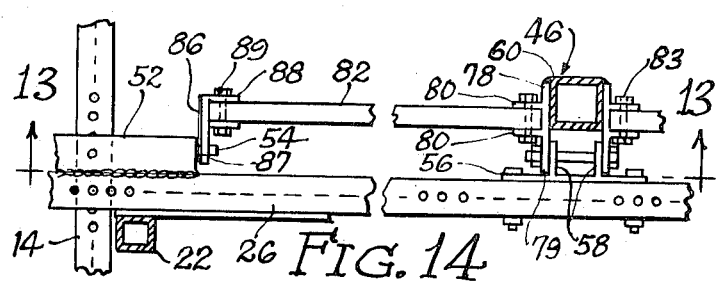
FIG. 12
FIG. 14

3,797,672

APPARATUS ATTACHABLE TO A TRUCK BODY OR THE LIKE FOR USE FOR HOISTING OR LIFTING, OR AS AN ELEVATED SUPPORT

BRIEF SUMMARY OF THE INVENTION

One of the objects of this invention is to provide a unit which may be readily attached to the truck body of a vehicle and which supports a main beam to be carried by said vehicle in such a manner that the main beam is normally positioned in a substantially horizontal position whereby the vehicle may, with the main beam in such horizontal position, move from location to location and when it is desired to make use of the functional purpose of the main beam in a vertical upright position, the main beam may be elevated to such a position so that it serves its intended function and then may be subsequently lowered to its substantially horizontal position to permit the vehicle to be moved.

Another object of this invention is to provide a structure in which the base frame and the main bracing means are formed of tubular stock, square in cross-section, with spaced alined openings on each of the sides of the tubular members so that the structure is adjustable to fit any size truck body.

Another object of this invention is to provide a structure which when in assembled condition can be readily removed from the truck body in such assembled condition and stored to make the truck body available for conventional use, and when it is subsequently desired to use the unit it may be readily attached to the truck body in assembled condition.

Another object of this invention is to provide the main beam with means for lifting a load, whereby the load may be lifted from below the vehicle to an elevated position at the top of the main beam.

Another object of this invention is to provide a main beam with means whereby a person can climb the height of the main beam when in its elevated position to stand thereon while the vehicle is moving so that the person in such elevated position at a considerable height can perform certain functions such as, for example, installing or replacing street lights or the like at various heights.

Another object of this invention is to provide a main beam of the foregoing character which may provide a seat or a stand for supporting a person at a considerable height.

Another object of this invention is to provide a unit of the foregoing character which is made of components which are disassembled and in a knockdown condition so that same may be readily and compactly shipped and stored in a minimum of space, yet may be readily assembled and secured to a vehicle in a relatively short time and where the main beam has an overall length of approximately 30 feet, yet with the unit connected to the vehicle it may be moved about from place to place with the main beam in either a substantially horizontal position or in an upright position.

Another object of this invention is to provide a structure which may be secured to the truck body of a motor vehicle so that it extends above the floor of the truck body and does not interfere with the normal storage area or carrying capacity of the truck body.

Another object of this invention is to provide a structure in which the main beam is formed of a plurality of sections which may be readily assembled to form a beam of a substantial length and substantial strength to support heavy loads. Likewise, the main beam may by using a lesser number of sections be of a reduced length, thus providing a main beam which is adaptable to various desired heights.

DESCRIPTION OF THE DRAWINGS

In the drawings:

FIG. 1 is a top plan view assembled with the main beam or mast in its horizontal position.

FIG. 2 is a side elevational view of FIG. 1.

FIG. 3 is a view on line 3—3 of FIG. 1, with the main beam in horizontal position.

FIG. 4 is a top plan view taken on line 4—4 of FIG. 3.

FIG. 5 is a rear elevational view taken on line 5—5 of FIG. 2.

FIG. 6 is a side elevational view taken on line 6—6 of FIG. 1.

FIG. 7 is a view taken on line 7—7 of FIG. 1.

FIG. 8 is a view partly in section taken on line 8—8 of FIG. 7.

FIG. 9 is a side elevational view with the unit mounted on a vehicle, such as a truck body or the like, showing the main beam in horizontal position, with the top cross-member positioned at right angles to the main beam and with the latching means and bracing means elevated so that the main beam is in position to be elevated or raised by operating the winch. Said Figure also shows in dotted lines the partial elevation of the main beam when fully elevated.

FIG. 10 is a side elevational view showing the main beam in the fully elevated position with the unit operating as a lift for lifting a load.

FIG. 11 is an enlarged view partly in section showing certain of the parts in the position of FIG. 10, with the main beam in fully elevated position and locked.

FIG. 12 is a rear end elevational view with the main beam in fully elevated position.

FIG. 13 is an enlarged rear end view of certain of the parts taken on line 13—13 of FIG. 14.

FIG. 14 is a view taken on line 14—14 of FIG. 13; and

FIG. 15 is a modification showing the main beam equipped with rungs to form steps and with a collapsible stand on the upper end of the main beam.

The broad aspect of the overall general description of the unit will be first described so that same may be properly oriented and a detailed description will follow.

The invention is comprised of components which when disassembled may be crated and shipped in a very compact form, such as in a container or box having an overall length of approximately 9 feet and a width and height of approximately 2 feet so that same can be economically shipped and stored in a minimum of space. It may be readily assembled and attached to an open bed truck body of the character shown in FIG. 9 so that the main beam has a length of approximately 18 feet. FIG. 9 shows the main beam in its horizontal position with the top cross-member positioned at right angles thereto for the purpose of illustration. In its horizontal position it extends over and forwardly of the cab. FIGS. 1 and 2 show the main beam in this horizontal position with the top cross-member collapsed, wherein the top cross-member is positioned on and parallel with the main beam. In this position the motor vehicle may be driven to the desired location where it is intended to serve as a lift.

For the lift operation the main beam is elevated from the horizontal position to a generally vertical or upright position, such as shown in FIG. 10, by operating a winch. After the beam is elevated to its substantially vertical position and locked therein the load lift pulley is connected to the load and by operating the winch the load may be raised and/or lowered. FIG. 10 shows in dotted lines the position of the cable and the pulley attached to a load for hoisting said load.

After it has served its function as a load lifting device the main beam may be lowered to its horizontal position to extend over the cab of the vehicle, with the cross-member positioned substantially parallel with the main beam, as shown in FIG. 2, and the motor vehicle may be driven or moved to another location. With the main beam in the vertical, raised or hoisted position, the overall height from the ground surface would be approximately 23 feet, taking into account the height of the base frame on which the beam is supported.

It should be noted that while the invention is shown in connection with a hoisting device, that the main beam can be provided with spaced cross bars, such as shown in FIG. 15, which form steps so that, if desired, when the main beam is raised a person can stand on any one of the steps or rungs for the purpose of replacing street lights or the like, or the upper end of the main beam may be provided with a collapsible platform so that a person may sit or stand thereon, with the beam in its elevated position, for performing a function such as when serving as a fire truck snorkle or the like. It will also be seen that with the unit mounted on a truck body, the base frame of the unit and the operating parts are positioned free and clear of the floor of the truck body so that tools and the like may be carried in such space. That is, this unit does not interfere with the carrying capacity of the vehicle body.

Base Frame

The conventional open bed truck body 10 is provided with stake sockets 12, two of which are adjacent the rear end of the body and two of which are adjacent the front. These stake sockets are used to accommodate the four vertically extending tubular members or legs 14 of the base frame generally designated by the numeral 16. The stake sockets 12 are each drilled to provide a transverse opening so that when the lower ends of the vertical tubular legs 14 of the support frame are inserted therein they can be secured to the state sockets by suitable pins or bolts 18.

The four tubular legs 14 of the base frame are each square in cross-section and said tubular legs are provided along their length on each of their four sides with vertically alined spaced openings 20, with the diametrically opposite openings also alined. Spaced from the bottom end of each of the legs 14 is a continuous flange 21 which is permanently affixed to the leg. One of each of said legs 14 is inserted into each of the stake sockets 12 of the truck body so that the flange 21 rests on top of the stake socket, with the bottom portion of the legs extending into the stake sockets. The pin or bolt 18 is transversely inserted into the transverse opening in the stake socket and said bolt passes through the alined openings 20 in the bottom of the leg. The bolt 18 is locked in place by a suitable nut. This anchors the four legs 14 of the base frame to the open bed truck body.

The base frame 14 also has a pair of spaced side members 22 and front and rear cross-members 24 and 26 respectively. The spaced side members 22 and the front and rear cross-members 24 and 26 are each tubular and square in cross-section and each has spaced alined openings 27 and 28 respectively on each of their four respective sides, similar to those described in connection with the legs 14. The side members 22 are secured to the legs 14 by triangular-shaped plates 30 which in turn are secured by fastening bolts and nuts 32 to the sides 22 and to the legs 14. The bolts 32 pass through the respective spaced openings in the sides and legs, as well as through alined openings in the plates. The front and rear cross-members 24 and 26 are likewise secured to the legs 14 by similar triangular-shaped plates 34 likewise secured by bolts and nuts 35. The cross-members 24 and 26 also rest on the sides 22. The sides 22 and cross-members 24 and 26 are secured to the legs 14 a spaced distance downwardly from the top of the legs 14 (FIGS. 10 and 12).

The aforedescribed members forming the base frame 16, as well as the other components, are shipped in knockdown or disassembled condition and are readily connected together by the fastening bolts and nuts and are likewise anchored to the truck body to provide a sturdy base support for the unit.

The front cross-member 24 of the base frame (FIGS. 1, 9 and 10) has secured it to a triangular support generally indicated at 36a which includes a pair of metal strips or bars 36 which are welded or otherwise secured at their outer ends 37 to the opposite ends of the front cross-member 24, and each bar extends diagonally forward towards the center where their forward ends are connected as at 38 to the front end of a short tubular member 40 which is square-shaped in cross-section and similar to the previously described tubing. The rear end of the short section is affixed as at 41 to the center of the front cross-member 24. Telescopically supported in the short tubular member 40 is a similarly shaped tubular section 42 which forms an extension and said extension 42 supports a roller 43 at the front end thereof. As seen in FIG. 10, this support would extend over the top of the cab portion of the vehicle.

The main beam which is pivotally supported on the base frame 16 is generally designated by the numeral 46 and said main beam is supported in its upright position by a bracing means generally indicated at 48 and pivotally secured to the base frame at one end and at its opposite end to latching means generally indicated at 50, which are pivotally secured to the bracing means 48. The latching means 50 latch the main beam in its upright position. The specific details of the aforementioned structure will now be described in detail.

Affixed to the rear cross-member 26 of the base frame adjacent each of the opposite ends are short tubular sections 52 (FIGS. 1, 4, 14) with the inner end of each supporting a pin 54 which provides a pivotal support for the arms attached to the main beam and extending laterally thereof. A bracket 56 is permanently affixed to the rear cross-member 26 centrally thereof. Said bracket has spaced ears 58 (FIGS. 4, 14). The main beam 46 is pivotally supported on said spaced ears.

Main Beam

The main beam which is generally indicated at 46 is formed of a plurality of steel tubular sections which interfit telescopically at their ends and are connected to form a beam of substantially 28 feet in length. The tubular sections are generally square-shaped in cross-section. The main beam comprises a lower section 60 (FIG. 10) which is of approximately 9 feet in length, and an upper section 62 of approximately 9 feet in length, the rear end of which is of reduced dimension to telescopically interfit as at 63 with the lower section 60. A front similarly shaped tubular section generally indicated at 64 interfits telescopically with the upper section 62. These sections are coupled and locked together by a suitable fastening means to form a single beam or post.

The front section 64 is slotted as at 65 and is provided with transverse openings 66 at its outer end so that it may receive a cross-beam bar 68 which is pivotally supported on a removable pin or bolt 69 secured in the openings 66 and extending through opening 70 in the cross-bar 68. The cross beam bar 68 at each of its opposite ends carries a pulley 72. A link 74 pivotally connects at its opposite ends, as at 75 and 76, the cross-bar 68 to the front section 64 of the beam. There are two such links, one on each side (FIG. 2).

The cross-beam bar 68 when positioned in its operating position (FIG. 10) for use in lifting is positioned at substantially right angles to the main beam and the pin or bolt 69 is inserted in the openings 66 and 70 to support the cross-bar in such position. The connecting links 74 are positioned as shown in FIG. 10. When the beam 46 is positioned in its horizontal position, such as when the truck is being driven or moved (FIG. 2), it is preferable to position the cross-bar 68 as shown in FIG. 2 so that it does not interfere with the driver's vision. In this situation the pin or bolt 69 is withdrawn and the cross-bar 68 is retracted and said cross-bar is positioned on the main beam 46 parallel thereto (FIG. 2). The connecting links 74 retain the cross-bar secured to section 64.

The main beam 46 is mounted on the base frame 16 so that it is moved from its substantially horizontal position, as shown in full lines in FIGS. 2 and 9, to its substantially upright or vertical position, which is its position when in use, as shown in FIGS. 10 and 11. The main beam or boom is moved from its horizontal to its upright position and vice versa by means of a winch, to be described. The same winch also serves when the boom is in its upright position to raise the load when the unit is used as a load lifting device.

The main beam 46 is supported on the base frame 16 for pivotal movement as follows. The lower section 60 of the main beam (FIGS. 3, 4, 14) has welded or brazed to each of the sides thereof but spaced from the rear end, a bracket 78 which has an uptanding ear 79 provided with a suitable opening and a pair of spaced laterally extending ears 80 with alined openings. Thus, there are two spaced upstanding ears 79 and a pair of spaced laterally extending ears 80 from each of the opposite sides of the main beam.

The main beam 46 is positioned with respect to the rear cross-member 26 of the base frame so that the upstanding beam ears 79 are alined with the spaced ears 58 on the rear cross-member 26 and a bolt 81 secured by a nut passes through said pairs of ears 58 and 79 for pivotally securing the main beam 46 to the base frame.

An arm generally designated at 82 (FIGS. 4, 13, 14) is secured on each of the two opposite sides of the main beam. Each said arm has its inner end positioned between the spaced laterally extending ears 80 and is secured thereto by a bolt 83 and nut. The outer end of each of said arms 82 has fixedly secured thereto a bracket 86 (FIGS. 13, 14) which has a downwardly extending portion 87 having an opening to receive the pin 54 to permit rotation of the arms on said pins. The bracket 86 also extends forwardly of arm 82 as at 88 and pivotally secured as at 89 to said forward extension is a diagonally positioned bracing bar 90. One diagonally positioned bracing bar 90 is secured on each side of the main beam.

The front end of each bracing bar 90 is secured as at 92 between a pair of spaced laterally extending ears 94 (FIG. 4) affixed to the main beam. The bracing bars 90 may when the unit is disassembled be positioned against the sides of the beam section parallel thereto. The main beam is thus pivotally supported on the rear cross-member of the base frame centrally and at the outer ends of the arms 82. As shown, the lower end of the main beam is positioned below the rear cross-member of the base frame so that the rear cross-member does not interfere with the beam in its horizontal or vertical positions.

Secured to each of the forward extensions 88 on the arms 82 (FIGS. 1, 12) is a turnbuckle 96 to which is secured a guy cable 98, the opposite end of which is anchored as at 99 to anchors 100 secured to the main beam. The two guy cables extend diagonally from the lower end towards the upper end to provide support for the main beam (FIG. 12).

Fixedly secured to the lower end of the main beam is a winch 102 (FIGS. 3, 10). The winch operates a cable 104 which cable extends from the winch across the two pulleys 72 on the opposite ends of the main beam cross-bar 68. A hook 105 (FIG. 3) is secured to the end of the cable 104. The cable 104 passes around a pulley 108 of the load pulley unit generally indicated at 106, having a frame 107 which supports the pulley 108. The cable 104 continues reversely as at 104' and the hook 105 on the end thereof is detachably secured as at 113 (FIG. 10) to the cross bar 68.

The load pulley unit 106 has a cross pin 109 at one end of the pulley frame. The opposite end of the pulley frame pivotally supports as at 110 a hook 111 which is detachably secured to a cross pin 112 secured to the spaced latching members 144 of the latching means 50. When it is desired to raise the main beam 46, the cross arm 68 is positioned and locked at right angles to the main beam, as shown in FIG. 9. The load pulley unit 106 is then connected by a hook 111 to the pin 112 with the cable hook 105 connected to the cross arm 68 as at 113 adjacent the pulley 72.

As the cable 104 is withdrawn into the winch 102, the latching means 50 are elevated to the position shown in FIG. 10, which also raises the bracing means 48 to the angular position shown. The latching means will then be locked in its upright position, as will be subsequently explained. Pulling of the cable 104 in the winch will then pull up the main beam from its horizontal position to its vertical position.

The winch 102 is of conventional construction and has two handles 103 which work in unison for operating same. It has a selfengaging brake which automatically takes over and locks the cable in any position. Reversing the righthand control handle 103 releases the brake and allows the cable to be moved.

Thus, when the main beam is in its upright position and secured to the locking means, as shown in FIG. 10, the hook 111 of the load pulley is detached from the cross pin 112 which is connected to the spaced latching members 144 of the latching means 50 and the hook 111 of the load pulley unit is connected to the load L to be lifted, and then by rotating the handles 103 of the winch 102 the load is lifted as the cable is withdrawn into the winch.

Bracing Means

Secured by fastening means 114 to the front cross member 24 of the base frame 16 is a bracket generally indicated at 116 (FIGS. 1, 3, 4) having two pairs of rearwardly facing spaced ears 118. Pivotally secured between each pair of spaced ears 118 by a fastening bolt 120 is a tubular bracing member 122 similar to the tubular members forming the base frame. Also positioned on the fastening bolt 120 is a roller 124. The two spaced tubular members 122 extend parallel to each other and extend in length beyond the rear cross-member of the base frame. The two tubular members 122 form the beam bracing means previously identified by the numeral 48. Pivotally secured to the rear ends of the spaced tubular members 122 is the latching means previously identified generally by the numeral 50 which latches the main beam in its upright or vertical position.

Latching Means

The latching means generally indicated at 50 includes a frame generally indicated at 126 formed of a pair of spaced bars 128 (FIGS. 1, 2, 3, 5, 11, 13) which are pivotally secured as at 130 to the rear of the two tubular bracing members 122. The bars 128 of the frame 126 are offset inwardly (FIG. 13) adjacent the bottom and support therebetween a stationary plate 132 welded to the two bars 128 of the frame. The bottom of the stationary plate 132 has a pair of spaced forwardly extending lips 134 and 134' (FIGS. 11, 13) which form a pocket 135 therebetween for engagement with a bolt or pin 81 mounted on the bracket 56 of the base frame 16. The lower lip 134' is shorter than the upper lip 134.

Positioned rearwardly of the stationary plate 132 is a slidable plate 138 which is slidably secured to the stationary plate by fastening bolts 139 passing through a slot 140 in the slidable plate 138. The slidable plate 138 has a rearwardly extending upper lip 141. When the stationary plate 132 is in engagement with the pin 81 on the base frame 16 and the slidable plate 138 is in its lower position (FIG. 11), the frame 126 of the latching means cannot be moved rearwardly at its lower end as it will engage the cross-member 26. This provides a safety factor to prevent disengagement. To permit disengagement the sliding plate 138 is manually elevated so that the lower end of the slidable plate is above the rear cross bar 26 and this will provide enough clearance to move the frame 126 rearwardly sufficiently for the lower lip 134' of the stationary plate 132 to clear the pin 81.

The frame 126 of the latching means 50 also supports therebetween a pair of spaced latching members generally designated by the numeral 144 (FIGS. 3, 11) which are pivotally supported on a cross pin 146 secured to the sides of the frame 126. The latching members 144 are of a generally L-shaped configuration and are provided with spaced angularly disposed latching teeth 148 adapted to engage laterally extending pins 150 on the main beam 46. The spaced latching members 144 each have a hook 154 at the rear end which hooks are adapted to engage a pin 156 (FIG. 3) on the main beam 46 to lock the latching means 50 to the main beam 46 when the beam is in horizontal position, as in FIG. 3. The previously described rod or cross pin 112 is secured to the spaced latching members 144 on the latching means 50 and said cross pin 112 extends between said latching members 144 and is to be engaged by the hook 111 on the pulley frame 106 connected to the cable 104 for the purpose of elevating the latching means 50 to its elevated vertical position. The latching members 144 are spring biased by a spring 158 to normally urge the latching members to pivot counterclockwise, as viewed in FIG. 11, for the purpose of positively engaging the pin 150 on the beam to secure the beam in upright position.

The frame 126 of the latching means 50 also pivotally supports therebetween another pair of spaced latching members generally indicated at 160 (FIGS. 3, 11). The latching members are pivotally supported on a cross pin 162 secured to the frame 126 and said latching members have a pair of spaced downwardly extending latching teeth 164. When the main beam is in its vertical or elevated position (FIG. 11) the latching members 160 are adapted to engage laterally extending pins 166 on the main beam for the purpose of latching the main beam in its vertical position. The latching members 160 are gravity operated. The latching members have stop pins 167 which engage the sides of the frame 126 to limit their inward pivotal movement (FIGS. 3, 11). A cross rod 168 is connected to the spaced latching members 160 to provide support for the latching members.

The front legs 14 of the base frame 16 adjacent the upper end have rearwardly extending brackets 170 (FIG. 10) affixed thereto, with a turnbuckle 172 attached to each. A guy cable 174 is connected to the turnbuckle 172 with the opposite end of the cable connected to an anchoring member 176 on the section 62 of the main beam 46. These two guy cables 174 (FIG. 10) help support the main beam in its upright position so that the lifting operation which places a pull on the opposite side of the main beam is counterbalanced by the cables.

Storing

As shown in the drawings, the main beam is formed of two sections 60 and 62 which are secured together as aforedescribed, with the front section 64 which supports the cross bar secured to the upper section 62. To provide a main beam of a greater length, a third section approximately 8 feet in length, generally indicated at 180 and similar to section 62, is telescopically secured to the front end of section 62 with the front section 64 to be secured thereto.

The third section 180 is normally stored and carried on the base frame 16, as best shown in FIGS. 2 and 6. The third section 180 has an ear 181 brazed to it with an opening which engages a rearwardly extending pin 182 on the rear of the triangular support 36a. An L-shaped bracket 184 is secured adjacent the other end of the third section 180 and the bracket 184 is secured by a suitable bolt and nut 185 to the side member 22 of the base frame 16.

The vehicle with the two section main beam in the horizontal position, as in FIGS. 2 and 9, can be driven and moved from place to place without the beam extending forwardly of the vehicle. However, when it is desired to utilize a longer main beam at the point of operation, the third section 180 can be readily coupled to the two beam sections 60 and 62 and placed in operation.

With the base support supported on the truck body, as shown in FIG. 9, the horizontal members of the base frame, as well as the main beam, are positioned at a substantial height from the floor of the truck body, permitting tools and other equipment to be carried in the truck body without interference from the unit. The sides of the base frame support grooved rollers 186 so that when it is desired to transport the beam in its assembled horizontal position (FIGS. 1, 2) the cables can be passed around the rollers with the inner ends of the cables anchored to the base frame.

FIG. 15

FIG. 15 shows a modification in which the main beam 46' is likewise formed of a plurality of sections as previously described. The sections of the main beam are provided with spaced cross bars 188 which form steps to ascend the main beam when in upright position. Adjacent the upper end of the main beam on each side thereof is a platform 190 which is pivotally mounted as at 191. The inner ends of the platform have a downwardly vertical extension 192 which is integral with the platform and said extensions engage the sides of the main beam to maintain the platforms in horizontal position and to prevent them from dropping downwardly below the horizontal position. Guard rails 194 and 195 are pivotally secured to the platforms to protect the person standing thereon. The platforms and guard rails may be pivoted to a collapsed non-use position by pivoting the platforms 190 upwardly so that they extend parallel to the beam. The guard rails 194 and 195 will likewise be similarly positioned.

Operation

With the parts assembled, the main beam 46 is positioned in its substantially horizontal position, as shown in FIGS. 1, 2 3 and 9, and the upper section 62 of the main beam 46 rests on the forwardly extending triangular support 36a of the base frame 16. The latching means 50, as well as the bracing means 48 are in their lowered position and in this position the two bracing members 128 are substantially horizontal, with the rear ends of said bracing members resting on the rear cross-member 26 of the base frame 16. The frame 126 of the latching means 50 is positioned at a slightly inclined angle, as shown in FIG. 3, and the latching members 144 and 160 thereof are positioned in a generally inclined upright position, perpendicularly inclined with respect to the frame 126. The spring biased latching members 144 are hooked to the pin 156 on the main beam 46 by hook 154 on the latching member. The cross beam bar 68 will have previously been moved from its FIG. 2 collapsed position and locked in its operating position, as shown in FIG. 9, where it is transverse to the longitudinal axis of the main beam. With the parts in this position, the first step is to elevate the latching means 50.

By operating the winch 102 the cable 104 will wind into the winch so that the latching means 50 is elevated from the inclined horizontal position (FIG. 3) to the vertical position (FIG. 10). Simultaneously it pivots the bracing means 48 at the front end to raise the rear ends of the bracing bars 122 to an inclined angle, as shown in FIG. 10. The lower end of the latching means 50 (FIG. 11) will be moved into engagement with the cross pin 81 on the base frame to firmly support the lower end of the latching means in the upright position and this also supports the bracing means 48. With the hook 111 of the load pulley 106 still attached to the pin 112, the winch is operated to continue withdrawing the cable 104 into the winch. The cable 104 will then elevate the main beam from the horizontal position of FIG. 9 to the fully upright position shown in said Figure.

As the main beam raises to its elevated position, the cross pin 150 on the beam will be engaged by the spring biased latching member 144 which serves to latch the beam in its vertical or upright position to the latching means 50. Simultaneously the latching member 160 which is gravity operated will lock with the other pin 166 on the main beam to lock the main beam in its upright position. While the description herein refers to the upright position, it will be understood, and as more clearly shown in FIG. 10, that the main beam in its upright position is inclined at an angle of approximately 10° towards the rear. This is so that when the device is used as a hoisting device the beam will be inclined in the direction of the load to be lifted. It will be seen that the lower end of the latching means 50 in this position is locked to the cross pin 81 of the base frame and the main beam is thus locked to the latching means 50.

To use the unit for the purpose of lifting a load L, such as shown in phantom in FIG. 10, the hook 111 of the load pulley unit 106 is detached from the latching means 50 and the hook 111 is then free to be connected to a load L. By rotating the handles 103 of the winch the cable 104 is retracted into the winch to shorten the cable and thereby lift the load. The cable hook 105 remains connected as at 113 to the cross-member 68.

To lower the main beam 46 from the upright position to the horizontal position, the hook 111 of the load pulley 106 is connected to the pin 112 and the winch is unwound, which gradually slackens the cable 104. However, before slackening the cable 104, the latching members 144 and 160 are disengaged from the upright main beam. This releases the main beam to permit its movement to a horizontal position. After the main beam has been horizontally positioned, the latching means 50 is then disengaged from the pin 81 by moving same rearwardly or to the left from the FIG. 11 position so that the lower lip 134' clears the pin 81, at which time the slidable plate is raised. This will permit the frame 128 of the latching member to be pivoted as at 130 inwardly to the horizontal position, as in FIG. 3, as the cable 104 continues to slacken. The bracing members will likewise assume the collapsed position shown in FIG. 3.

Instead of using the unit to lift a load, as shown in FIG. 10, the main beam in the upright position may be used in a manner shown in FIG. 15, to permit a person to climb thereon and stand in an elevated position to permit the installation of light bulbs and the like.

What is claimed is:

1. A structure of the character described comprising a base frame adapted for securement to a truck body of a motor vehicle or the like, said base frame including a front cross-member, a rear cross-member, bracing means comprising a pair of spaced longitudinally extending members pivotally connected to said front cross-member with said longitudinally extending members extending to said rear cross-member, said longitudinally extending members extending substantially centrally on the sides of said base frame, a main beam supported on said base frame and centrally positioned between said pair of spaced longitudinally extending members, said main beam adapted for movement from a substantially horizontal non-use position to a substantially vertical upright position for use, means including a winch and a cable for moving said beam from said horizontal position to the substantially vertical position and vice versa, a cross-member secured adjacent the outer end of said main beam, said cross-member adapted when in use to be positioned to extend transversely to said main beam and when in non-use positioned to be positioned substantially parallel with the main beam, said winch secured to said main beam with said winch operating the cable and in which the cross-member has pulleys at the opposite ends of said cross-member, with the cable cooperating with said pulleys whereby said cable may be connected to a load for raising said load by the operation of said winch, latching means pivotally secured to said longitudinally extending bracing members, said latching means adapted to be connected to said cable to be raised by the cable to simultaneously elevate said spaced longitudinal bracing members, said latching means including a frame member which supports a spring biased latching member for latching engagement with said main beam, and a second latching member gravity operated for engagement with said main beam for latching said main beam in upright position.

2. A structure as set forth in claim 1 in which the base includes a plurality of spaced legs and a pair of spaced sides which spaced sides and front and rear cross-members form a generally square or rectangular shape in plan.

3. A structure as set forth in claim 2 in which the legs, sides, front and rear cross-members of the base frame are tubular and square in cross-section with spaced openings whereby said members may be connected at said openings to provide a base frame of a size determined by the size of the truck body.

4. A structure as set forth in claim 1 in which the cable is connected to a load pulley which supports a hook which is detachably secured to the latching means when said latching means is to be raised and which hook is adapted to be attached to a load for lifting the load when the beam is locked in upright position.

5. A structure as set forth in claim 1 in which the spring biased latching member has upwardly extending teeth which engage a cross-pin on the main beam and in which the gravity operated latching member has downwardly extending teeth for engagement with a cross-pin on the main beam.

6. A structure as set forth in claim 1 in which the frame member of the latching means has means at the lower end for engaging a pin on the base frame for positively locking said latching frame to said base frame, which last mentioned means has a stationary plate and a slidable plate slidable relative to the stationary plate and gravity operated to prevent disengagement of said latching frame from said base frame, said slidable plate adapted to be manually lifted to permit disengagement of said latching frame from its positively locked position.

7. A structure as set forth in claim 1 in which the main beam has means thereon where a person may stand and be supported thereon while said beam is in an upright position.

8. A structure as set forth in claim 7 in which the main beam has spaced cross-bars forming steps for ascending the beam.

9. A structure as set forth in claim 1 in which the base frame, main beam and bracing means are detachable and disassembled and are in a knockdown condition and are readily assembled and secured to a truck body to form the operating unit.

10. A structure of the character described comprising a base frame adapted for securement to a truck body of a motor vehicle or the like, said base frame including a front cross-member and a rear cross-member, longitudinally extending bracing means pivotally connected to said front cross-member with said bracing means extending to said rear cross-member, a main beam supported on said base frame and centrally positioned on said base frame for movement from a substantially horizontal non-use position to a substantially vertical upright position for use, means including a winch and a cable for moving said beam from said horizontal position to the substantially vertical position and vice versa, a cross-member secured adjacent the outer end of said main beam, said cross-member adapted when in use to be positioned to extend transversely of said main beam and when in non-use position to be positioned substantially parallel with said main beam, said winch secured to said main beam, with said winch operating the cable and in which the cross-member has pulleys at the opposite ends of said cross-member, with the cable cooperating with said pulleys whereby said cable may be connected to a load for raising said load by operation of said winch, latching means pivotally secured to said longitudinally extending bracing means adjacent the rear of said bracing means, said latching means adapted to be connected to said cable to be raised by the cable to simultaneously elevate said bracing means, said latching means including a spring biased latching member for engagement with said main beam, and a second latching member for engagement with said main beam for locking said main beam in upright position.

11. A structure as set forth in claim 10 in which the base includes a plurality of spaced legs and a pair of spaced sides which spaced sides and front and rear cross-members form a generally square or rectangular shape in plan.

12. A structure as set forth in claim 10 in which the legs, sides, front and rear cross-members of the base frame are tubular and square in cross-section with spaced openings whereby said members may be connected at said openings to provide a base frame of a size determined by the size of the truck body.

13. A structure as set forth in claim 10 in which the cable is connected to a load pulley which supports a hook which is detachably secured to the latching means when said latching means is to be raised and which hook is adapted to be attached to a load for lifting the load when the beam is locked in upright position.

14. A structure as set forth in claim 10 in which the spring biased latching member has upwardly extending teeth which engage a cross-pin on the main beam and in which the gravity operated latching member has downwardly extending teeth for engagement with a cross-pin on the main beam.

15. A structure as set forth in claim 10 in which the latching means has a frame which has means at the lower end for engaging a pin on the base frame for positively locking said latching frame to said base frame, which last mentioned means has a stationary plate and a slidable plate slidable relative to the stationary plate and gravity operated to prevent disengagement of said latching frame from said base frame, said slidable plate adapted to be manually lifted to permit disengagement of said latching frame from its positively locked position.

16. A structure as set forth in claim 10 in which the main beam has means thereon where a person may stand and be supported thereon while said beam is in upright position.

17. A structure as set forth in claim 16 in which the main beam has spaced cross-bars forming steps for ascending the beam.

18. The structure as set forth in claim 10 in which the base frame, main beam and bracing means are detachable and disassembled and are transported in a knockdown condition and are readily assembled and secured to a truck body to form the operating unit.

* * * * *